United States Patent
Klapf et al.

(10) Patent No.: US 8,330,578 B2
(45) Date of Patent: Dec. 11, 2012

(54) TRANSPONDER DEVICE AND METHOD FOR PROVIDING A SUPPLY VOLTAGE

(75) Inventors: Christian Klapf, Graz (AT); Albert Missoni, Graz (AT); Guenter Hofer, St. Oswald (AT)

(73) Assignees: Infineon Technologies Austria AG, Villach (AT); Technische Universitaet Graz, Graz (AT)

( * ) Notice: Subject to any disclaimer, the term of this patent is extended or adjusted under 35 U.S.C. 154(b) by 1555 days.

(21) Appl. No.: 11/748,879

(22) Filed: May 15, 2007

(65) Prior Publication Data

US 2008/0252418 A1 Oct. 16, 2008

(30) Foreign Application Priority Data

Apr. 13, 2007 (DE) .................. 10 2007 017 534

(51) Int. Cl.
*H04Q 5/22* (2006.01)
(52) U.S. Cl. .................. 340/10.1; 340/540; 340/636.12
(58) Field of Classification Search .................. 340/10.1, 340/540, 636.12
See application file for complete search history.

(56) References Cited

U.S. PATENT DOCUMENTS

| | | | | |
|---|---|---|---|---|
| 5,345,231 A * | 9/1994 | Koo et al. | ................ | 340/870.31 |
| 5,521,590 A * | 5/1996 | Hanaoka et al. | ............ | 340/10.51 |
| 6,466,634 B1 * | 10/2002 | O'Toole et al. | ................ | 375/374 |
| 6,480,099 B1 * | 11/2002 | Ziegler | .......................... | 340/10.1 |
| 7,097,109 B2 * | 8/2006 | Berger | .......................... | 235/492 |
| 2005/0242926 A1 | 11/2005 | Berger | | |
| 2006/0081717 A1 | 4/2006 | Berger | | |

FOREIGN PATENT DOCUMENTS

| | | |
|---|---|---|
| DE | 102 45 747 A1 | 4/2004 |
| DE | 10 2005 037 582 A1 | 2/2007 |
| WO | WO-2004/055712 A1 | 7/2004 |
| WO | WO-2007/017464 A1 | 2/2007 |

* cited by examiner

*Primary Examiner* — Jennifer Mehmood
*Assistant Examiner* — Naomi Small
(74) *Attorney, Agent, or Firm* — Dickstein Shapiro LLP

(57) ABSTRACT

Transponder circuit arrangement having antenna connections for application of a voltage signal, a load-reduction modulation device, which is coupled to the antenna connections and is designed to modulate the applied, unmodulated voltage signal, which is at a first level, and a voltage conversion device, which is coupled to the load-reduction modulation device and is designed to provide a supply voltage, the magnitude of whose level is greater than the first level.

30 Claims, 5 Drawing Sheets

TRANSPONDER DEVICE AND METHOD FOR PROVIDING A SUPPLY VOLTAGE

CROSS-REFERENCE TO RELATED APPLICATION

This application claims priority to German Patent Application Serial No. 102007017534.7, which was filed Apr. 13, 2007, and is incorporated herein by reference in its entirety.

FIELD OF THE INVENTION

The invention relates to a transponder circuit arrangement, and to a method for provision of a supply voltage.

BACKGROUND

So-called radio-frequency identification systems, or "RFID" systems for short, are being used ever more widely. In principle, they may comprise two components, specifically a so-called transponder and a detection appliance, which is normally a combined reader/writer.

The transponder may be linked to an object which is intended for identification, with the detection appliance carrying out this identification by non-contacting means. The detection appliance typically comprises a radio-frequency module, with a transmitter and receiver, a monitoring unit and a coupling element for the transponder. The transponder, which represents the actual data storage medium for an RFID system, normally comprises a coupling element as well as an electronic component, a so-called chip. No specific voltage supply is normally provided in the transponder. Its behavior is passive outside the response area of the detection appliance. The energy which is required for operation of the transponder is transmitted by the coupling unit to the transponder without contact.

The communication between the transponder and the detection appliance normally takes place by means of a modulated data signal.

Load modulation is normally used for data transmission, in which the magnitude of the level of the unmodulated signal is reduced on modulation.

High energy levels can be received by the transponder when power is supplied, particularly in the short-range area, and this can result in heating of the circuit arrangement, or of parts of it.

The power loss resulting from the field is proportional to the antenna voltage. However, load modulation as is normally used for RFID transponders is impossible if the antenna voltages are low. Load-reduction modulation, in which the level of the unmodulated signal is less than the level of the modulated signal, is therefore used, with switching taking place between this level and another level on modulation.

SUMMARY OF THE INVENTION

A transponder circuit arrangement including antenna connections which are designed for application of a voltage signal, a load-reduction modulation device, which is coupled to the antenna connections and is designed to modulate the applied, unmodulated voltage signal, which is at a first level, and a voltage conversion device, which is coupled to the load-reduction modulation device and is designed to provide a supply voltage, the magnitude of whose level is greater than the first level.

BRIEF DESCRIPTION OF THE DRAWINGS

The invention will be explained in the following text using embodiments and with reference to the drawings.

DETAILED DESCRIPTION OF THE INVENTION

Figure 1:
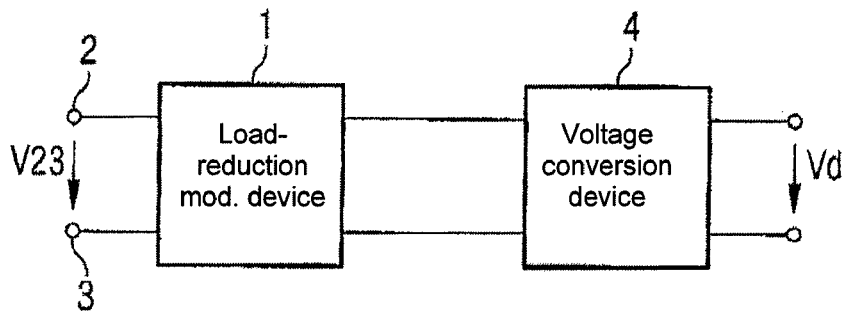
FIG. 1 shows one embodiment of a transponder circuit arrangement.

FIG. 1 shows a schematic illustration of one embodiment of a transponder circuit arrangement having antenna connections 2, 3 for application of a voltage signal V23. A load-reduction modulation device 1 is also provided, and is coupled to the antenna connections 2, 3. The load-reduction modulation device 1 is designed to modulate the unmodulated voltage signal V23 which is present between the antenna connections 2, 3 and is at a first level. The transponder circuit arrangement furthermore comprises a voltage conversion device 4, which is coupled to the load-reduction modulation device 1 and is designed to provide a supply voltage Vd, the magnitude of whose level is greater than the first level.

Figure 2:
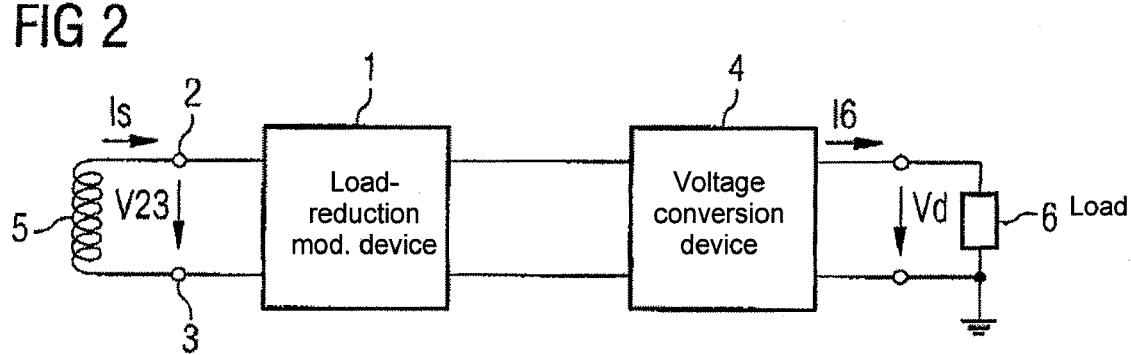
FIG. 2 shows a schematic illustration of one embodiment of a transponder.

FIG. 2 shows one embodiment of a transponder which has the abovementioned features, so that these features will not be described at this point.

An antenna 5 is also provided, and is connected to the antenna connections 2, 3. Power is transmitted to the transponder by means of an electromagnetic field via the antenna 5, so that the voltage signal V23 is induced, and an antenna current Is flows.

Furthermore, a load 6 is provided downstream from the voltage conversion device 4, and is fed with the supply voltage Vd. A load current I6 flows when the load 6 is fed.

A transponder circuit arrangement such as this provides the power required for operation of the transponder from the field produced by the reader. This is provided via the unmodulated antenna voltage V23, which is induced in the antenna 5 and corresponds to the unmodulated voltage signal. A supply voltage Vd, which is required in order to supply the transponder circuit and is higher than the unmodulated voltage signal, is provided by the voltage conversion device 4. Because the first level is low, the power loss in the transponder circuit arrangement is less than in the case of conventional transponder circuit arrangements. The power loss is reduced by reducing the antenna voltage.

In one embodiment, because of the load-reduction modulation, the modulated voltage signal is switched backward and forward between a second level, whose magnitude is greater than the first level, and a third level, whose magnitude is less than the second level.

One embodiment of the voltage conversion device comprises a charge pump, in order to convert the voltage which is present at the antenna connections to the supply voltage. This is particularly necessary for the unmodulated signal at the first level, in order to provide a supply voltage at a higher level.

Since the voltage signal is normally an AC voltage signal and the supply voltage inside the transponder is a DC voltage, a rectification device is provided in one embodiment.

One embodiment of the load-reduction modulation device comprises an arrangement with a variable resistance, in order to switch between the levels of the unmodulated voltage signal and the modulated voltage signal.

In one embodiment, an inductive coupling element is provided and is coupled to the antenna connections, in order to provide the voltage signal for the power supply.

In one embodiment, the first level is predetermined by the type of inductive coupling element and/or circuit arrangement such that the first level of the unmodulated voltage signal is just sufficient for operation of the circuit arrangement during normal operation. This antenna voltage, which is the minimum for operation of the transponder circuit arrangement, makes use of the effect that a low antenna voltage results in a low power loss, which also means a reduction in the heating.

In one embodiment of the transponder circuit arrangement, a clock recovery device and an oscillator are provided. The clock recovery device is designed to generate a clock signal from the voltage signal, and the oscillator can be synchronized with this clock signal. If the level of the voltage signal is so low that the clock synchronization fails, the previously synchronized oscillator provides the clock signal on a free-running basis. This ensures clocked operation of the transponder circuit arrangement even when the voltage signal level is low, and even when it is no longer possible to generate a clock signal from the voltage signal.

Figure 3:
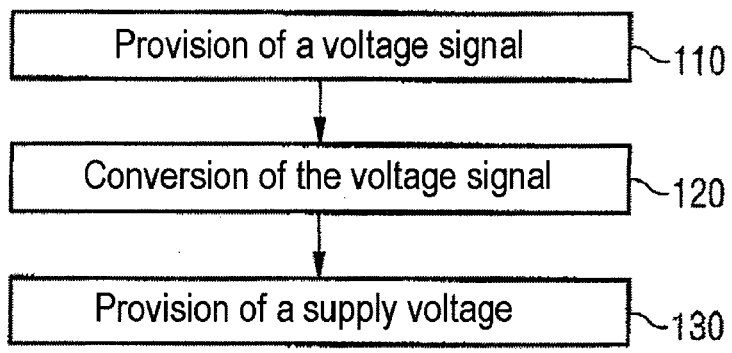
FIG. 3 shows one embodiment of a method for provision of a supply voltage.

FIG. 3 schematically shows the major steps for provision of the supply voltage Vd for a transponder circuit.

A method for provision of a supply voltage provides for this supply voltage to be converted from a voltage signal which can be load-reduction modulated. The unmodulated voltage signal is at a first level. The magnitude of the level of the supply voltage is greater than the first level.

FIG. 3 shows that the voltage signal V23 which is present at the antenna connections 2, 3 is provided as a supply voltage. This provision is represented by the block 110. The voltage signal is converted in order to produce the supply voltage from it, as is illustrated by the blocks 120 and 130.

In one embodiment, the voltage conversion is carried out by a charge pump.

In order to provide a DC voltage as the supply voltage, the voltage signal, which is in the form of an AC voltage, is rectified in one embodiment.

The voltage signal in one embodiment is provided by an antenna.

Figure 4:
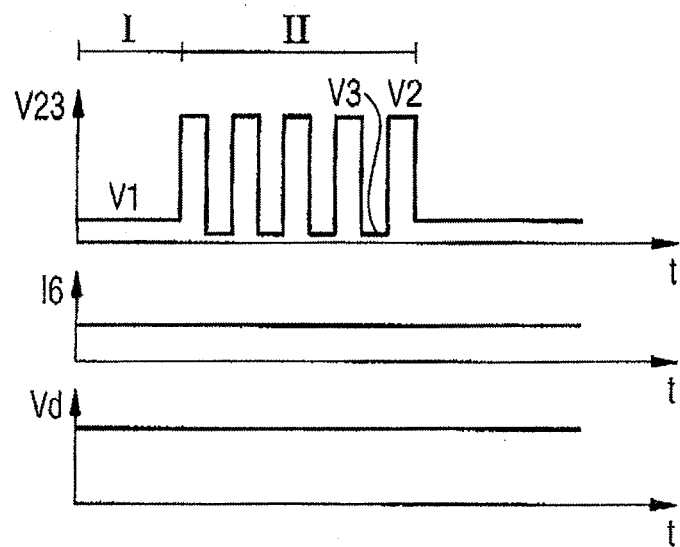
FIG. 4 shows a timing diagram with signals which occur in one embodiment of the transponder circuit arrangement.

FIG. 4 shows an example of the waveform of voltage and current signals in order to supply voltage in one embodiment of the transponder circuit arrangement.

The voltage signal V23 is plotted over the time axis t, the load current I6 for feeding the load 6 is plotted over the time t, and the supply voltage Vd for supplying voltage to the load element 6 is plotted over the time t.

The illustrated signals show the principle of load-reduction modulation.

In the time period I, the voltage signal V23 is unmodulated and is at the first level V1. This voltage signal V23 is converted by means of the voltage conversion device 4 to the supply voltage Vd, the magnitude of whose level is greater. It should be noted that the illustration of the voltage signal V23 represents the envelope of the oscillating signal. The alternating component has not been illustrated, for the sake of clarity. The supply voltage Vd is a DC voltage.

The load-reduction modulation is illustrated in the time period II. During load-reduction modulation, the level of the signal V23 is switched between a second level V2 and a third level V3 as a function of the data to be transmitted. The magnitude of the second level V2 of the modulated signal V23 is greater than the third level V3. The first level V1 of the unmodulated signal in the illustrated embodiment is greater than the third level V3 and is less than the second level V2. In one embodiment, the first level V1 of the unmodulated signal is less than the third level V3, which is less than the second level V2.

For data transmission, the transponder circuit arrangement is designed to modulate the voltage V23 which is present at the antenna connections 2, 3, in order to communicate with a detection appliance or reader.

In conventional circuit arrangements which use so-called load modulation, the level during modulation is lower than that during unmodulated operation. During the time periods with reduced levels, the antenna voltage is not sufficient to feed the load, and this can result in the load current and the supply voltage collapsing.

In contrast to this, in the illustrated embodiment, the fluctuations which occur in the load current I6 or in the supply voltage Vd as a result of the modulation are considerably less during modulation.

This is because the voltage supply for the transponder is designed for the unmodulated voltage signal. In the time period I, in which there is no modulation, more energy is normally absorbed than is required for operation of the circuit. In order to prevent overloading of the circuit which is located on the transponder, the excess power which is not required is converted into thermal energy in a so-called shunt, which results in parasitic heat being developed. The parasitic heating is proportional to the magnitude of the antenna voltage V23, and is considerably reduced by reduction of V23 in conjunction with the load-reduction modulation.

The load-reduction modulation furthermore allows a higher data range as a result of the greater voltage shift to the second level V2 which is possible in comparison to load modulation.

Figure 5:
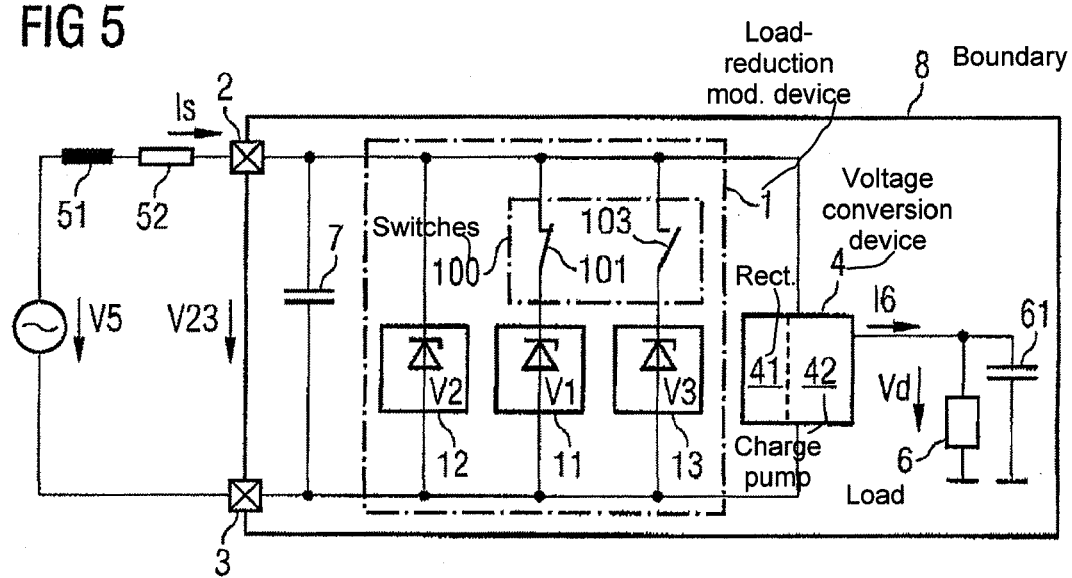
FIG. 5 shows one embodiment of a transponder.

FIG. 5 shows one embodiment of a transponder having an antenna whose electrical characteristics are represented by an antenna resistance and an inductance 52, 51. The antenna is coupled to the antenna connections 2, 3.

A tuning capacitor 7 is provided between the antenna connections 2, 3 and tunes the antenna circuit of the transponder to a resonant frequency.

Furthermore, a load-reduction modulation device 1 is provided having voltage clamping devices 11, 12, 13, one of which is used as a shunt 12. A portion of the antenna current which is not required for operation of the transponder is dissipated via the shunt 12 that is coupled between the antenna connections 2, 3, thus resulting in heat being developed. The first level V1 of the unmodulated voltage is set by the shunt 12.

The load-reduction modulation device 1 furthermore comprises a first voltage clamping device 11, which can be coupled via a first switch 101 between the antenna connections 2, 3. A second voltage clamping device 13 can be coupled between the antenna connections 2, 3 via a second switch 103. The clamping devices 12, 13 can be decoupled from the antenna connection 2 by means of the switches 101, 103. The clamping devices 11, 13 make it possible to switch the voltage between the second level V2 and the third level V3 during modulation.

When the first switch 101, which is coupled to it, is closed, the first clamping device 11 starts to carry current at a predetermined voltage V1. When the second switch 103, which is coupled to it, is closed, the second clamping device 13 starts to carry current at a predetermined voltage V3. These therefore influence the Q-factor of the antenna circuit, and therefore limit the antenna voltage during modulation at the second level V2 or at the third level V3.

The voltage V23 which is present between the antenna connections is modulated in one embodiment by means of a switchable resistance arrangement, in which various resistances are provided instead of the clamping devices 11, 13. If the branch with the lower resistance is closed, this resistance governs the antenna voltage. In one embodiment, the resistance elements are in the form of zener diodes.

Figure 6A:
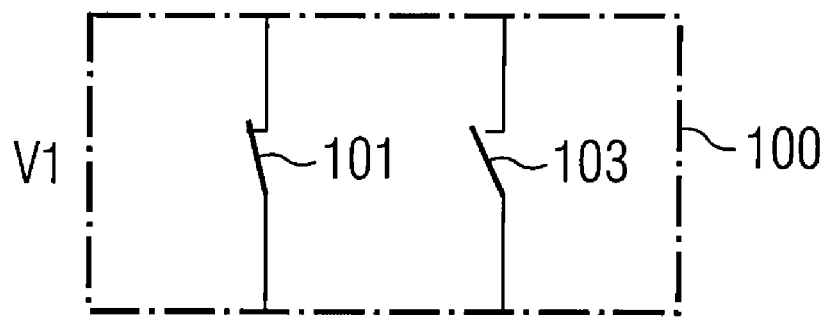
FIG. 6A shows switch positions in the embodiment of the transponder.
Figure 6B:
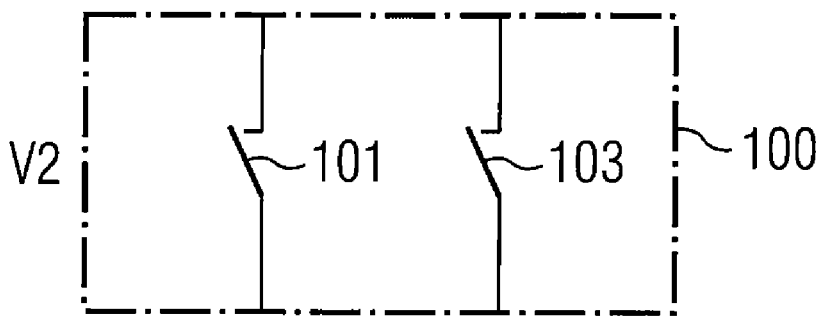
FIG. 6B shows switch positions in the embodiment of the transponder.
Figure 6C:
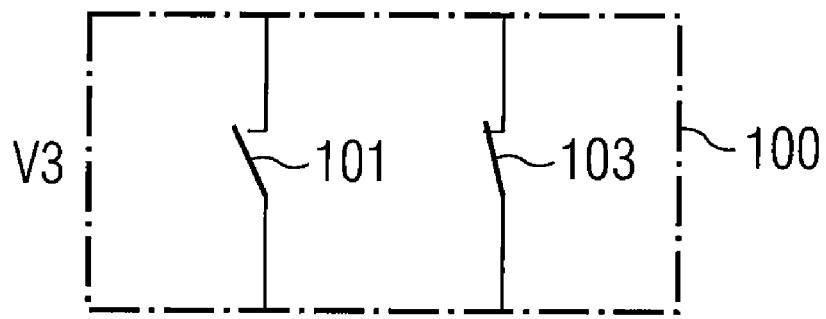
FIG. 6C shows switch positions in the embodiment of the transponder.

FIGS. 6A, 6B and 6C show various switch positions of the first and second switches 101, 103 in the embodiment shown in FIG. 5.

In FIG. 6A, the first switch 101 is closed, and the second switch 103 is open. This limits the antenna voltage V23 at the first level V1. The switch position is used to generate the unmodulated signal.

In FIG. 6B, the switches 101, 103 are open. The antenna voltage V23 is therefore governed by the second clamping device 12. The current flows via the second clamping device, so that the voltage between the antenna connections 2, 3 is limited at the second level V2.

In FIG. 6C, the second switch 103 is closed, and the first switch 101 is open. In consequence, the antenna voltage V23 is limited at the third level V3.

During modulation, switching takes place between the switch positions in FIGS. 6B and 6C as a function of the data signal to be generated, so that the modulated signal is switched backward and forward between the second level V2 and the third level V3, which is also referred to as "toggling".

Furthermore, a voltage conversion device 4 having a rectifier 41 and a charge pump 42 is provided. The rectifier 41 may be integrated in the charge pump, or may be connected upstream or downstream from it. The voltage conversion device 4 is coupled in parallel with the resistance elements 11, 12. In order to feed the load 6, the load current I6 and the supply voltage Vd are produced on the output side of the voltage conversion device 4. A buffer capacitor 61 is provided in parallel with the load 6, and smoothes voltage fluctuations of the supply voltage Vd.

The blocks 7, 12, 11, 4, 6, 61 which are surrounded by the boundary 8 are normally integrated within a chip or a component.

The method of operation of the circuit arrangement will be described in the following text.

When an electromagnetic field is being transmitted, a detection appliance induces an antenna current Is and a voltage V5 in the antenna. The voltage V23 which is present between the antenna connections 2, 3 depends on the impedance of the load-reduction modulation device 1, which is governed by the switch positions of the first and second switches 101, 103.

The induced AC voltage is converted by the voltage converter 4 to the supply voltage Vd. When the signal is unmodulated, this is done by the charge pump 42.

In one embodiment, the first level V1 of the antenna voltage V23 is predetermined such that the antenna voltage V23 is a minimum, that is to say its magnitude is just sufficient to operate the circuit arrangement during normal operation.

The low antenna voltage, that is to say the high attenuations, results in the transponder system having a broader bandwidth, and being less sensitive to detuning effects.

Figure 7:
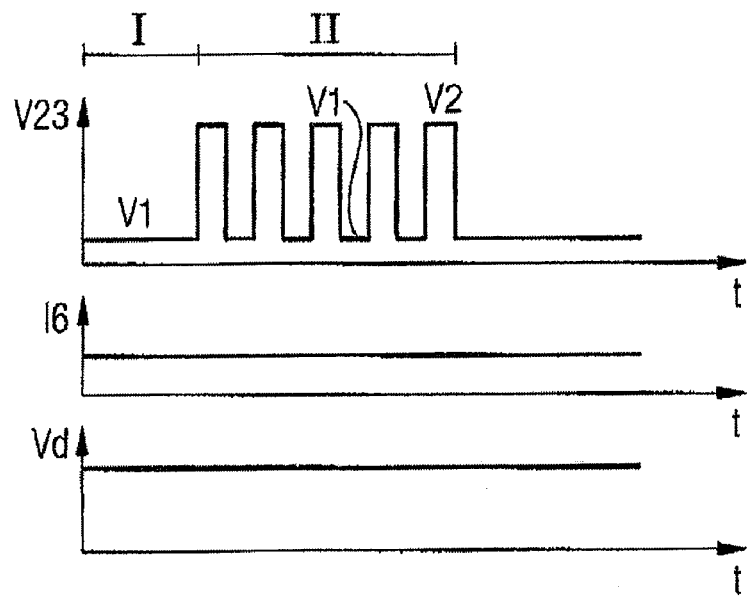
FIG. 7 shows a timing diagram with signals which occur in one embodiment of the transponder circuit arrangement.

FIG. 7 shows a signal waveform which differs from the signal waveform shown in FIG. 4 only in that the modulated signal is switched between the first level V1, which corresponds to the level of the unmodulated signal, and the second level V2. In this embodiment, the third level therefore corresponds to the first level V1.

Figure 8:
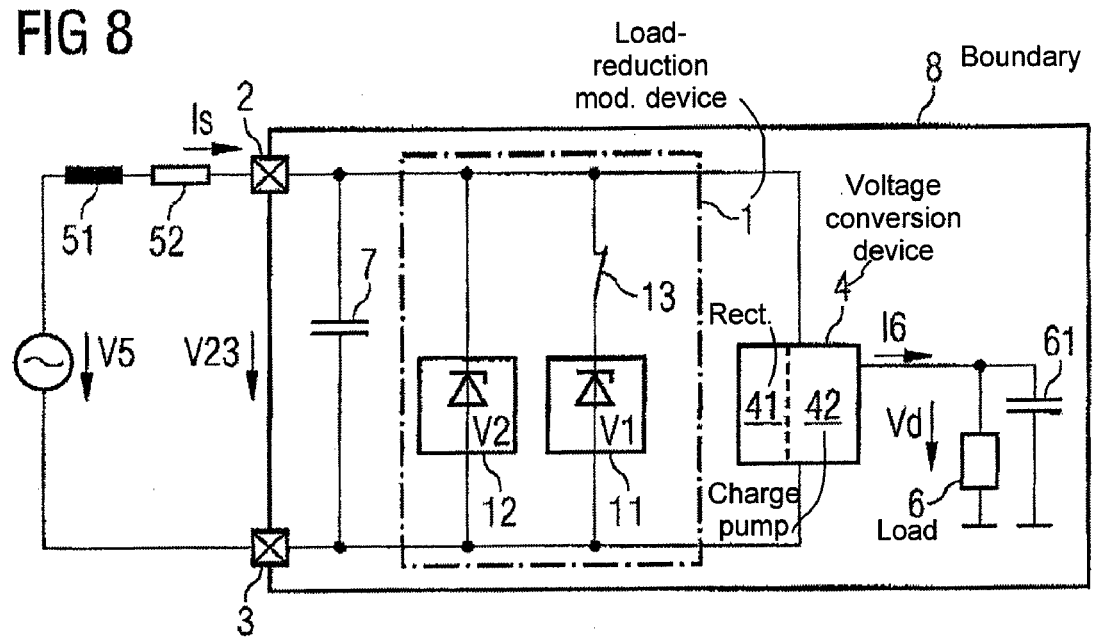
FIG. 8 shows one embodiment of a transponder.

A signal waveform such as this can be generated, for example, by the embodiment of a transponder shown in FIG. 8. The same reference symbols denote the same features. The following text will describe only differences between this embodiment and the embodiment shown in FIG. 5.

The embodiment shown in FIG. 8 has only two clamping devices 11, 12. A first clamping device is coupled between the antenna connections 2, 3 via a switch 13. The second clamping device 12 is coupled between the antenna connections 2, 3, and is used as a shunt. The voltage V23 which is present between the antenna connections 2, 3 depends on the resistance of the load-reduction modulation device 1. When the first clamping device 11 is decoupled by means of the switch 13, the voltage V23 is governed only by the shunt 12. When the first clamping device 12 is coupled between the antenna connections 2, 3, it governs the antenna voltage V23.

In one embodiment, a voltage of approximately 1 volt is dropped across the first resistance element 11, and a voltage of approximately 3 volts is dropped across the second resistance element 12, depending on the field strength and the embodiment.

In one embodiment, clock recovery is provided for operation of the transponder circuit arrangement and generates a clock signal from the voltage signal in order to provide the system clock, for example for the digital part as well, for the transponder. In one embodiment, the clock signal is required in order to predetermine the pulse length of the modulated signal for operation of the modulation device, which toggles between the second and the third level V2, V3. When the voltage signal is at the third level V3, clock recovery may be more difficult if the third level V3 is so low that clock recovery is no longer possible. In a situation such as this, the circuit can become desynchronized, or may not even operate at all.

Figure 9:
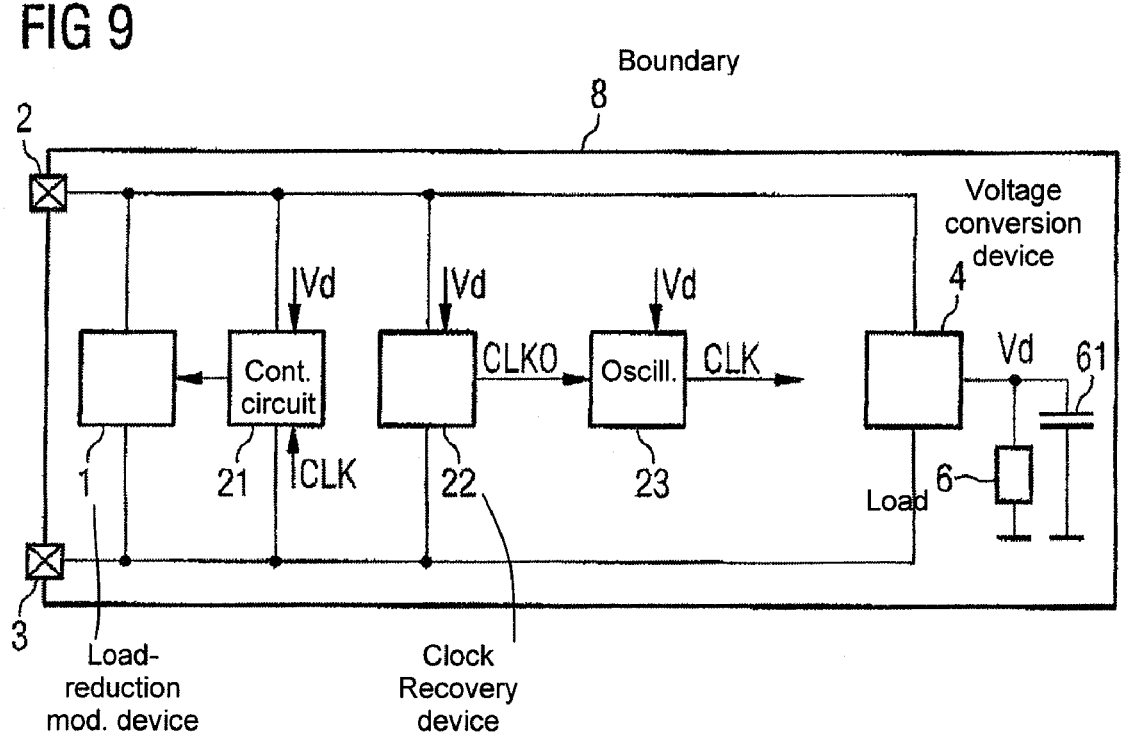
FIG. 9 shows a further embodiment of a transponder circuit arrangement.

FIG. 9 shows a further embodiment of a transponder circuit arrangement which can even be operated at a low third level V3.

The transponder circuit arrangement comprises a voltage conversion device 4 for provision of the supply voltage Vd.

Furthermore, the transponder circuit arrangement comprises two antenna connections 2, 3, between which a load-reduction modulation device 1 is coupled. Furthermore, a control circuit 21 is provided, which drives the load-reduction modulation device 1 such that the load-reduction modulation device 1 switches the voltage signal between the first level V1 when the signal is unmodulated, and the second and third levels V2, V3 when the signal is modulated. The control circuit 21 is operated as a function of a clock signal CLK which is produced within the circuitry.

In the case of passive RFID transponders, the internal system clock is obtained from the field of the reader, and this is also referred to as clock recovery. If the third level V3 is chosen to be very low during modulation, that is to say it tends toward 0 volts, the system clock can no longer be obtained from the field, and must be generated by an internal oscillator during this time.

A clock recovery device 22 and an oscillator 23 are provided for this purpose. The clock recovery device 22 uses the antenna signal to generate a first clock signal CLK0, with the detected clock frequency of the voltage signal in one embodiment being converted by a dividing device to the first clock signal CLK0 at a lower clock frequency.

The oscillator 23 is synchronized by the first clock signal CLK0 that is generated. In normal operation, in one embodiment, this oscillator 23 is synchronized via a PLL, that is to say a phase locked loop, with the system clock obtained from the field of the reader. If the third level V3 is present and clock recovery is no longer possible, the previously synchronized oscillator 23 continues to run, and provides the internal clock signal CLK on a free-running basis. This provision of the clock signal lasts for only a small number of clock cycles in one embodiment during which the third level V3 is present, until the clock recovery device 22 operates again, when the signal level changes. In one embodiment, the oscillator 23 freewheels during the back-modulation, that is to say when toggling between the second level V2 and the third level V3, and generates the system clock for this time period.

It should be noted that the features of the embodiments in FIGS. 1, 2, 5 and 8 can be combined with the features of the embodiment in FIG. 9.

What is claimed is:

1. A transponder circuit arrangement comprising:
   antenna connections which are designed for application of a voltage signal;
   a load-reduction modulation device, which is coupled to the antenna connections directly and is designed to modulate the applied, unmodulated voltage signal, which is at a first level; and
   a voltage conversion device, which is coupled to the load-reduction modulation device and is designed to provide a supply voltage, the magnitude of whose level is greater than the first level.

2. The transponder circuit arrangement as claimed in claim 1, wherein the modulated voltage signal can be switched between a second level, whose magnitude is greater than the first level, and a third level, whose magnitude is less than the second level.

3. The transponder circuit arrangement as claimed in claim 1, wherein the modulated voltage signal can be switched between the first level and a second level, whose magnitude is greater than the first level.

4. The transponder circuit arrangement as claimed in claim 1, wherein the voltage conversion device comprises a charge pump.

5. The transponder circuit arrangement as claimed in claim 1, wherein the voltage conversion device comprises a rectification device.

6. The transponder circuit arrangement as claimed in claim 1, wherein the load-reduction modulation device comprises an arrangement with a switchable resistance.

7. The transponder circuit arrangement as claimed in claim 1, further comprising:
   a clock recovery device which is designed to generate a clock signal from the voltage signal; and
   an oscillator which is coupled to the clock recovery device.

8. The transponder circuit arrangement as claimed in claim 7, wherein the oscillator can be synchronized with the clock signal.

9. The transponder circuit arrangement as claimed in claim 8, wherein the oscillator is designed to provide the clock signal on a free-running basis.

10. The transponder circuit arrangement as claimed in claim 1, wherein the load-reduction modulation device comprises a control circuit, which is designed to drive the load-reduction modulation device to switch the voltage signal between the first level when the signal is unmodulated, and second and third levels when the voltage signal is modulated, wherein the magnitude of the second level is greater than the first level, and the magnitude of the third level is less than the second level.

11. The transponder circuit arrangement as claimed in claim 1, further comprising an inductive coupling element which is coupled to the antenna connections.

12. The transponder circuit arrangement as claimed in claim 1, wherein the unmodulated voltage signal is just sufficient for operation of the circuit arrangement during normal operation.

13. A transponder comprising a transponder circuit arrangement as claimed in claim 1, wherein the voltage supply for the transponder is designed for the unmodulated voltage signal.

14. A transponder circuit arrangement comprising:
   a load-reduction modulation device which is coupled to antenna connections directly and is designed to modulate an unmodulated voltage signal which is applied between the antenna connections and is at a first level, such that the modulated voltage signal is switched between a second level, whose magnitude is greater than the first level, and a third level, whose magnitude is less than the second level; and
   a voltage conversion device, which is coupled to the load-reduction modulation device and is designed to provide a supply voltage, the magnitude of whose level is greater than the first level.

15. The transponder circuit arrangement as claimed in claim 14, wherein the voltage conversion device comprises a charge pump.

16. The transponder circuit arrangement as claimed in claim 14, wherein the voltage conversion device comprises a rectification device.

17. The transponder circuit arrangement as claimed in claim 14, wherein the load-reduction modulation device comprises an arrangement with a switchable resistance.

18. The transponder circuit arrangement as claimed in claim 14, further comprising:
   a clock recovery device which is designed to generate a clock signal from the voltage signal; and
   an oscillator which can be synchronized with the clock signal.

19. The transponder circuit arrangement as claimed in claim 18, wherein the oscillator is designed to provide the clock signal on a free-running basis.

20. The transponder circuit arrangement as claimed in claim 14, further comprising an antenna which is coupled to the antenna connections.

21. The transponder circuit arrangement as claimed in claim 14, wherein the level of the unmodulated voltage signal is predetermined in order to operate the circuit arrangement during normal operation.

22. A method for providing a supply voltage, comprising:
   providing a voltage signal; and
   converting directly the voltage signal to the supply voltage by load-reduction modulating the voltage signal,
   wherein the unmodulated voltage signal is at a first level, and the magnitude of the level of the supply voltage is greater than the first level.

23. The method as claimed in claim 22, wherein the voltage signal is modulated such that the modulated voltage signal is switched between a second level, whose magnitude is greater than the first level, and a third level, whose magnitude is less than the second level.

24. The method as claimed in claim 22, wherein the voltage conversion is carried out by a charge pump.

25. The method as claimed in claim 22, further comprising:
clock recovery generating a clock signal; and
synchronizing an oscillator with the clock signal.

26. The method as claimed in claim 25, further comprising the oscillator providing the clock signal on a free-running basis after synchronization.

27. The method as claimed in claim 22, further comprising rectifying the voltage signal.

28. The method as claimed in claim 22, wherein the voltage signal is provided by an antenna.

29. The method as claimed in claim 22, wherein the first level of the unmodulated voltage signal is just sufficient for operation of the circuit arrangement during normal operation.

30. A transponder circuit arrangement comprising:
antenna connections for application of a voltage signal;
a load-reduction modulation means, which is coupled to the antenna connections directly, for modulating the applied, unmodulated voltage signal, which is at a first level; and
a voltage conversion means, which is coupled to the load-reduction modulation device, for providing a supply voltage, the magnitude of whose level is greater than the first level.

* * * * *